3,196,818
PROCESS FOR THE MANUFACTURE OF STAMPED PLATES

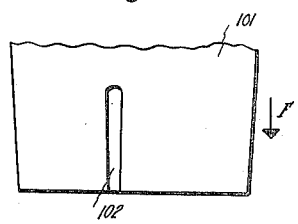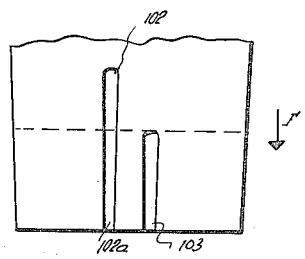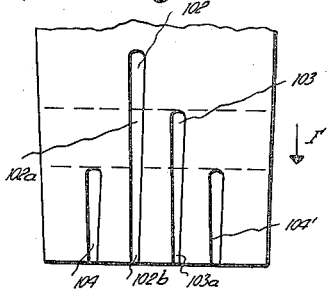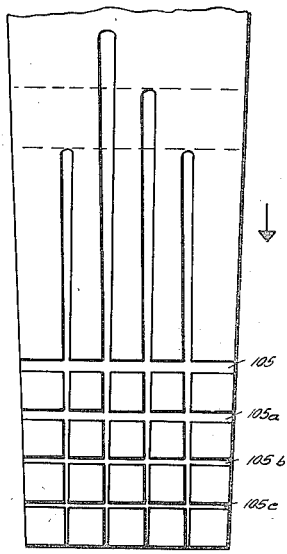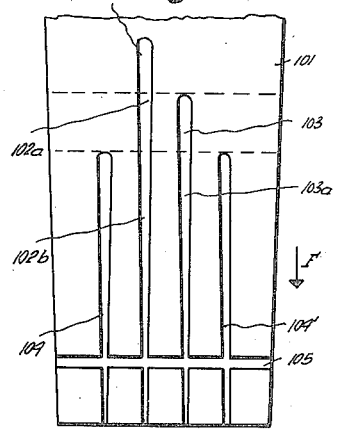

Juan Esteve Suñé, Paseo Bonanova 110, and Manuel Celaya Bordas and Enrique Celaya Bordas, Calle Urgel 55, all of Barcelona, Spain
Filed Jan. 23, 1961, Ser. No. 84,344
Claims priority, application Spain, Jan. 27, 1960, 255,602; May 28, 1960, 258,667; June 13, 1960, 259,149; June 13, 1960, 259,150
12 Claims. (Cl. 113—116)

The present invention refers to a process for the manufacture of stamped plates, to be used in particular for the formation of decorative coverings or overlays by means of which new effects are achieved which have so far not been obtained by known methods.

The process of the present invention may be described primarily as follows. A sheet is die pressed to produce in it a multiplicity of weakened lines in the manner of discontinuous sections defining polygonal contours. The spaces between the weakened sectors are stamped in order to obtain embossed polygons corresponding to the polygonal contours, and turned edges extending from the embossed polygons towards the grooves formed by the stampings. The edges of each embossed polygon are faced by the edges of the adjacent ones of the embossed polygons. The sides of the grooves are then pressed together until adjacent ones of the embossed polygons are in substantial contact with each other.

In this manner, parts are obtained of the required length and width which present in their visible facing a multiplicity of grooves, among which embossings are defined which enable mosiac effects or small tiles to be produced. This, combined with various possibilities as regards colouring and finish of the visible surface, particularly in cases where sheet metal, such as aluminum, which may later be anodized, or synthetic materials, is used considerably extends the variety of effects which can be produced in the plates obtained according to the invention.

If desired, before proceeding with the stamping which is to form the polygonal embossings, the spaces included between the adjacent weakening sections, for instance in the sectors corresponding to the edges between the polygonal contours, can be weakened subsequently by means of a punching operation which eliminates part of the intermediate material between these sectors in order to facilitate the final deformation of the plate for the purpose of joining the various stamped embossings.

In preference, the stamping of these embossed sections is carried out in such a way that a bevelled contour is formed between portions of the grooves formed between the sections which remain visible and the remaining portions of the grooves which are later pressed together into contact with each other. In certain cases, however, action can be taken so that the above bevels may include said remaining portions in their layout in the same plane and said remaining portions can be formed in the aforesaid operation of approaching the rows by means of a suitable outline of the tools which force the embossed rows against their adjacent ones. The stamping can also be carried out so as to form between adjacent rows a groove or rib stamped towards the lower face of the plate, without drilling or weakening. In such a case, it is only necessary to later press the sides of the cross grooves together.

As will be realized, the shapes most easily achieved are rectangular or square, but the invention also provides the possibility of applying the process to different embossed shapes, for instance triangular ones, rhomboidal or "lozenge" or shapes of a larger number of sides; always provided that they are coupled up so close to each other that they do not leave any blank spaces between them.

The execution of the above described process presents some drawbacks resulting from the operations which are to be performed and the need for them special dies for such operations. Furthermore, the pressing together of the sides of the stamped grooves in the final stage becomes particularly vexatious.

Therefore, in accordance with the invention and with an improved version of it, the initial operation of die-pressing of the basic sheets by a marking or stamping in continuous parallel rows, is dispensed with. Long channels or grooves are provided in the sheet and once they are stamped partially decrease the width of the said sheets.

To this purpose the material is made to pass in a continuous ribbon form—or in the shape of sheets of some suitable dimensions—under the action of a die, by means of which one single stamping is first made in the form of a channel or groove having a large width and a small depth and which brings about a minimum narrowing of the sheet. Other grooves or channels are then stamped on both sides of the one stamped groove and in an alternate manner without coincidence with the first one. The first stamped groove, as well as those started at subsequent stages, are then continued or lengthened so that the grooves became progressively more narrow in width the direction of advance of the sheet. The same die may be fitted with the necessary punches to produce another plurality of grooves or channels crosswise in relation to the first ones. The second plurality of grooves are stamped before the widths of the first plurality of grooves become too narrow so that the corresponding polygonal contours may be defined by both pluralities of grooves.

It is also essential, in accordance with the improvements themselves, that the marking of these cross lines is proceeded with, after the first one is marked, by a progressive stamping on the marked lines themselves, combined with stamping on the back face of the sheet the said polygonal contours and approach, also progressive, of their edges, with a view to ensuring that when the sheet leaves the die, it is completely finished.

To that effect, the die shall be fitted, for the final part of the operation, with suitable embossing devices which will reproduce the indicated polygonal contours, with ever smaller separations until the minimum one is reached which provides the closest contact of the sides of the grooves and thus the polygonal configurations.

It is still possible to adapt a much more simplified process, although this involves the drawing of the basis material which, to that end, must be of a suitable thickness. In accordance with this procedure, and the basic sheet metal, plastic or similar material is submitted to the action of a cylinder fitted with embossing devices corresponding to the polygonal contours to be stamped on that sheet, which may be of certain dimensions starting from a winding in the shape of a continuous band of the appropriate width. As is realised, the said cylinder shall normally be completed with a stamping counter-die, the embossing devices of the above cylinder acting as punches.

The said stamping will later and with advantage be followed by a final shaping with other similar punches and counter-dies, but with those nearest, in order to ensure contiguity of edges of the stamped polygonal contours thus making on the back face of the plate a series of crossed ribs which will constitute the working bond in the agglomerate or adhesive used for the application of the plate to the surface to be overlaid; the visible face of the plate will appear as being constituted by numerous small polygonal and contiguous parts, as happened in the case of the examples previously mentioned.

As a simplified alternative of the described process, the above mentioned dies and counter-dies, instead of being cylindrical or roller shape, may assume a flat form, operating at intervals in combination with intermittent advances of sheets or bands between them, similar results being obtained.

Finally and following a similar technique to that of the first example, it is possible to achieve the complete fractional division of polygonal contours in order to produce individual small parts which can be applied to the surface to overlay after adhesion to a supporting sheet (paper, fabric, plastic or similar) which will be removed after the said application. To this effect it will suffice to combine with the stamping operation of those polygonal contours—either during the operation itself or independently of this—another one of sectioning of the stamped polygonal parts on the sectors not die-pressed in order to completely separate them from each other.

For better understanding of the foregoing, a few drawings are attached herewith showing diagrammatically and only by way of example, some representative cases of practical work by the process which is the subject of the invention.

Figure 1:
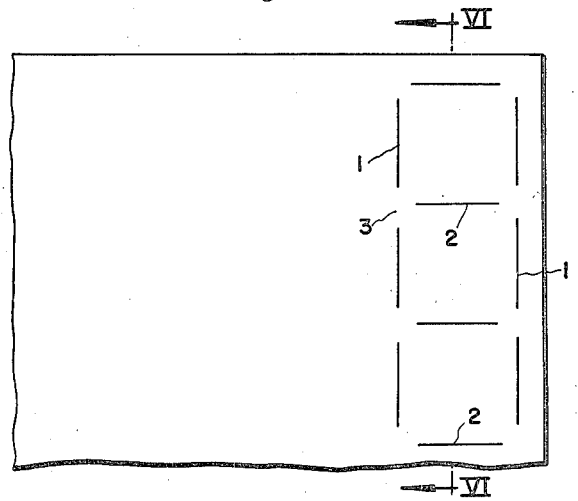
FIGURE 1 is a partial view of the plate after the die-pressing operation according to the initial procedure.
Figure 2:
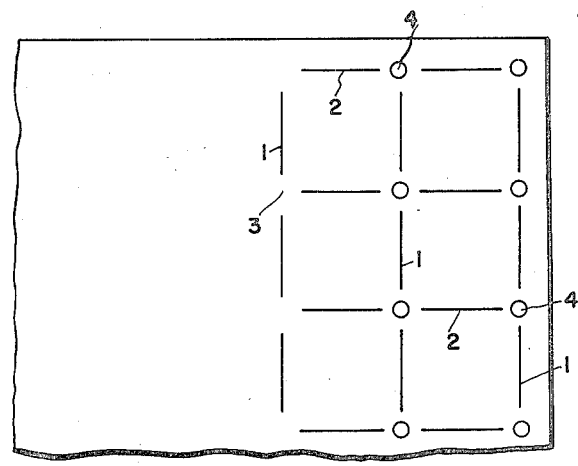
FIGURE 2 shows the same plate after the punching and subsequent die-pressing.
Figure 3:
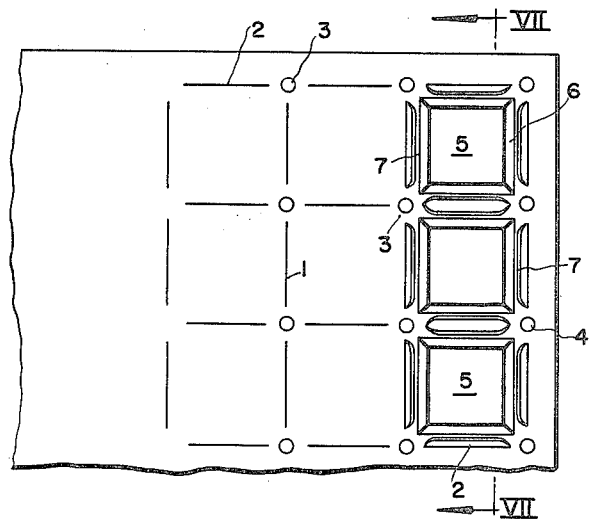
Figure 4:
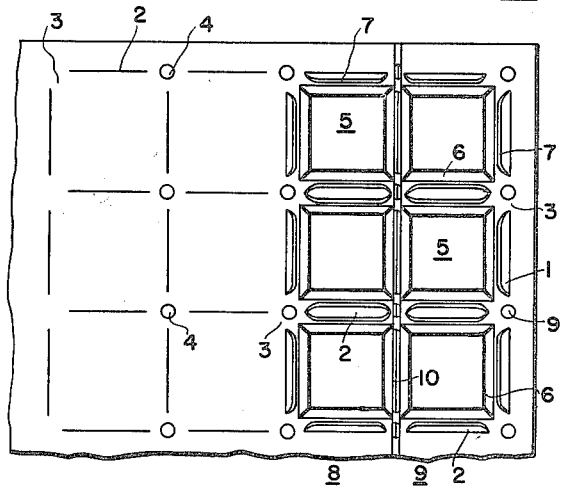
Figure 5:
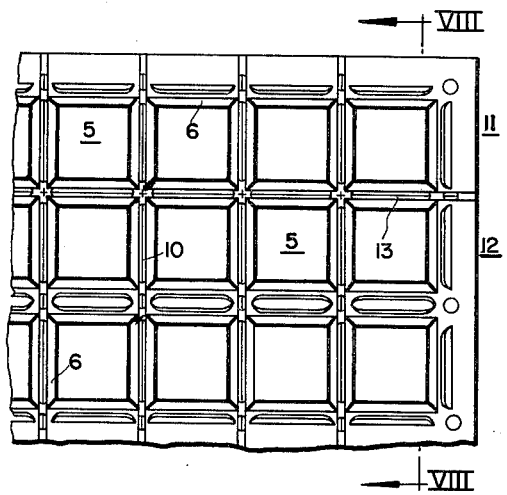
Figure 6:
Figure 7:
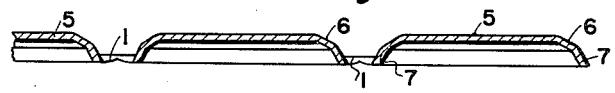
Figure 8:
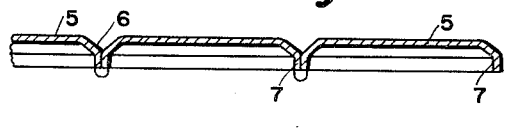

FIGURE 3 adds to previous diagrams the stamping of embossing sections;

FIGURE 4 shows the plate with stampings formed and two rows of these joined;

FIGURE 5 shows four vertical rows joined and two horizontal rows which have also been joined;

FIGURES 6 and 7 and 8 are, respectively, cross sections taken on the lines VI—VI, VII—VII and VIII—VIII from FIGURES 1, 3 and 5;

FIGURES 9 to 13 represent the various operational stages of "conformation" of a sheet in accordance with a greatly improved version of the same process.

As is appreciated from FIGURES 1 to 8 the plate is provided with a multiplicity of vertical sections 1, as well as horizontal sections 2 in relation to the figures, the ends of which will not get joined and leave the parts of intermediate material 3. These sections, in accordance with FIG. 6, can be obtained, for instance, by means of a combination of punches which perforate the sheet metal alternatively, the said sections could cross at the edges of the polygons which they define, leaving intermediate parts of the sides of the said polygons unintersected. Another possibility would be to make a series of perforations or suitable cuts.

The next operation, carried out in accordance with the example given, is to punch the holes 4 in the intermediate sectors 3, which can be effected by means of a suitable punch die, but this operation, if it should be so desired, could be postponed until after the stamping of the embossed sections or else excluded, if the material used is sufficiently soft.

Then the stamping of the embossed sections 5 is proceeded with the shape of small tiles or tablets provided with marginal bevelling 6 and walls or laterally bent edges 7, the adjacent embossings facing one another.

The rivetting operation can be carried out, for instance, by means of two sets of jaws, each one of which is firmly applied to the two faces of the sheet metal between the stampings of two consecutive rows, the two jaws of each set being "conformed" to the shape of the facing edges of the rows. Under these circumstances, the two sets of jaws can be approached until the sides 7 of the tablets of the two facing rows can be made to enter lengthwise. In FIGURE 4 these two rows have been marked with reference numbers 8 and 9, having between them the junction line designated with number 10.

In subsequent operations, the junction of all the other rows pointing in the same direction can be brought about, after which these operations can be repeated for the rows extending traversely to the previous ones, for instance 11 and 12 of FIGURE 5, between which the lines of junction 13 are formed.

In these operations, the material included between drills 3 and the ends of the sections 1 and 2 is stamped towards the back side of the sheet, thus helping to obtain a better fixing of the finished plates to the surface to be lined, for which purpose use can be made of any cement, mortar or other adhesive which completely fills the back recesses of the plates.

The present process has been described on the assumption that the work is done successively by means of consecutively operating dies, and that the formation of the stamped structure at the various stages is perforated on an advancing plate of given dimensions, but it is also possible to work in a substantially similar manner on a continuous strip from which plates of suitable dimensions are severed by a direct cut or the previous formation of a weakened line in the appropriate place. In this case, the joining of the rows may be carried out, simultaneously with the other operations, on the longitudinal rows, in the most suitable sequence and grouping. Of course, these operations can also be carried out simultaneously for the whole of the surface of the plate. On the other hand, some of these operations can be combined in a single stroke of the press, for instance die-pressing and punching.

FIGURES 9 to 13 show the working stages, according to a particularly favorable method, in accordance with which the initial marking on the plate is provided by means of a suitable die which imparts to the material a channelled stamping 102 of shallow depth and relatively great width, establishing a certain shrinking of the plate 101.

In the following stages (FIGURE 10) the channelled stamping 102 is made larger by providing it with portion 102a which extends longitudinally from its front end while another channelled stamping 103 is marked laterally and of the stamping 102, this latter stamping 103 also being of shallow depth and comparatively great width, thereby causing still more shrinkage of the plate between both stampings.

The said plate 101 is moved under the respective die, in the direction of arrow F and at the next stage, at which the lines 102 and 103 are provided with still other sectors 102b and 103a, further new sectors are added laterally of those already existing, these newest sectors being numbered 104 and 104', this being done successively; the only limitation is that the marking or stamping of the sectors indicated must never be made to coincide so as not to bring about any drawing of the material which might weaken it, but only the progressive contraction of the basic sheet 101.

On the other hand, the extension of the marking of each one of the lines 102, 103, 104 . . . will be carried out in accordance with the invention in such a manner that the channels thus established become progressively narrower, tending to bring about the contiguity of their opposite edges.

Also in accordance with these improvements, when a given length has been reached on lines 102, 103, 104, etc., and before these have been excessively narrowed, marking (FIGURE 13) of cross lines or channels 105 begins, the width of which will also be progressively decreased so as to establish ever narrowing lines 105a, 105b, 105c . . . . This contiguity of the edges of lines 105, will in turn be coupled with the stamping of the polygonal contours formed on the back face of plate 101, in a similar way to that outlined above, but with the proviso that the die embossings which determine the said stamping should be in each sector of the die and be ever closer together, so as to bring about by themselves the maximum approach of both the longitudinal lines 102, 103, 104 . . . , and the cross lines 105a, 105b, 105c.

In this manner the plate 101, when leaving the matrix (or die), will present its surface already completely finished, the plate having been constituted with the desired embossings and being ready for direct application.

It is also possible to carry out the transformation of the plate by subjecting the basic sheet to the action of a cylinder fitted with embossings corresponding to the polygonal contours to be stamped in that sheet, which latter can be of suitable dimensions to allow it to proceed from a winding in the shape of a continuous band of adequate width. As is realised, the cylinder must be normally complemented with a counter-die for the stamping, the embossing devices of the said cylinder acting as punches engaging recesses in the counter-die.

The above mentioned stamping will be followed, later on and with advantage, by a final processing step with other similar punches and counter-punches, except that in this step the punches are nearer, so as to bring about contiguity of the edges of the stamped polygonal contours. On the back face of the plate this produces a series of cross ribs which will constitute the bond elements in the agglomerative and adhesive material which is used for the application of the plate to the surface to be lined, the visible face of the said plate after this final step then appearing as being constituted by numerous small adjacent polygonal parts, just as in the method previously mentioned.

As a simplified alternative of the process earlier described, the above dies and counter-dies, instead of being in the shape of a cylinder or roller, may assume a flat form, acting at given time intervals on intermittently advancing sheets or bands, and similar results will be achieved by this last mentioned method.

As has been explained previously, when referring to the example of FIGURES 1 to 8, the basic sheet is provided with cuts 1 and 2 as well as perforations 4 which outline the embossings 5 later to be stamped in the shape of small tiles or tablets provided with marginal bevellings 6 and walls or turned edges 7.

Proceeding in accordance with this technique, it is possible to bring about the separation of the formed polygonal parts by combining with the stamping operation—either in conjunction with it, or independently—a sectioning of the basic plate through the non die-pressed sectors of the same plate or sheet. Such loose, that is individual parts will constitute an excellent covering for any surfaces; to facilitate their handling they are advantageously adhered on a supporting sheet of paper, fabric, plastic or similar material, which can be withdrawn after forming the lining.

The invention also refers to a plate obtained according to any of the processes described in accordance with the general procedure, which plate is constituted by a sheet of any suitable material, be it metal, plastic material or similar material, and which sheet is formed, through stamping, with a series of polygonal contours appearing as embossings on one of its faces, their edges being contiguous with one another and forming projecting ribs on the back face of the sheet on which there are formed the cavities corresponding to those embossings, these aforesaid ribs constituting the binding elements with the agglomerative or adhesive materials used in the application of the sheet on the surface to be treated.

What we claim is:

1. A process for preparing decorative liners comprising the steps of forming a sheet of material to produce a plurality of weakened lines defining a plurality of contiguous polygonal configurations; stamping said sheet of material along said lines to form said plurality of contiguous polygonal configurations into a plurality of contiguous embossed polygons with grooves each having sides spaced from each other at one edge thereof to form the width of the groove formed between said embossed polygons, defining each of said embossed polygons, and spacing adjacent ones of said embossed polygons from each other by the width of said grooves; and urging the sides of each of said grooves together to narrow the width of each of said grooves and to bring adjacent ones of said embossed polygons closer to each other than the first-mentioned width of said grooves.

2. A process for preparing decorative liners comprising the steps of die pressing a sheet of material to produce a plurality of weakened lines defining a plurality of contiguous polygonal configurations; stamping said sheet of material along said lines to form said plurality of contiguous polygonal configurations into a plurality of contiguous embossed polygons with grooves each having sides spaced from each other at one edge thereof to form the width of the groove formed between said embossed polygons, defining each of said embossed polygons, and spacing adjacent ones of said embossed polygons from each other by the width of said grooves; and pressing the sides of each of said grooves together to narrow the width of each of said grooves and to bring adjacent ones of said embossed polygons closer to each other than the first-mentioned width of said grooves.

3. A process for preparing decorative liners comprising the steps of die pressing a sheet of material to produce a plurality of discontinuous weakened line segments defining a plurality of contiguous polygonal configurations; punching said sheet of material between said line segments to remove part of the material of said sheet between said line segments; stamping said sheet of material along said lines to form said plurality of contiguous polygonal configurations into a plurality of contiguous embossed polygons with grooves each having sides spaced from each other at one edge thereof to form the width of the groove formed between said embossed polygons, defining each of said embossed polygons, and spacing adjacent ones of said embossed polygons from each other by the width of said grooves; and pressing the sides of each of said grooves together to narrow the width of each of said grooves and to bring adjacent ones of said embossed polygons closer to each other than the first-mentioned width of said grooves.

4. A process for preparing decorative liners comprising the steps of die pressing a sheet of material to produce a plurality of partially cut discontinuous weakened line segments defining a plurality of contiguous polygonal configurations; stamping said sheet of material along said lines to form said plurality of contiguous polygonal configurations into a plurality of contiguous embossed polygons with grooves each having sides spaced from each other at one edge thereof to form the width of the groove formed between said embossed polygons, defining each of said embossed polygons, and spacing adjacent ones of said embossed polygons from each other by the width of said grooves; and pressing the sides of each of said grooves together to narrow the width of each of said grooves and to bring adjacent ones of said embossed polygons closer to each other than the first-mentioned width of said grooves.

5. A process for preparing decorative liners comprising the steps of die pressing a sheet of material to produce a plurality of partially cut discontinuous weakened line segments defining a plurality of contiguous polyonal configurations; punching said sheet of material between said line segments to remove part of the material of said sheet between said line segments; stamping said sheet of material along said lines to form said plurality of contiguous polygonal configurations into a plurality of contiguous embossed polygons with grooves each having sides spaced from each other at one edge thereof to form the width of the groove formed between said embossed polygons, defining each of said embossed polygons, and spacing adjacent ones of said embossed polygons from each other by the width of said grooves; and pressing the sides of each of said grooves together to narrow the width of each of said grooves and to bring adjacent ones of said embossed polygons closer to each other than the first-mentioned width of said grooves.

6. A process for preparing decorative liners comprising the steps of die pressing a sheet of material to produce a plurality of weakened lines defining a plurality of contiguous polygonal configurations; stamping said sheet of material along said lines to form said plurality of contiguous polygonal configurations into a plurality of contiguous embossed polygons with grooves each having sides spaced from each other at one edge thereof to form the width of the groove and joining each other at another edge thereof to form the depth of the groove formed between said embossed polygons, defining each of said embossed polygons, and spacing adjacent ones of said embossed polygons from each other by the width of said grooves; and pressing the sides of each of said grooves together to narrow the width and deepen the depth of each of said grooves and to bring adjacent ones of said embossed polygons into substantial contact with each other.

7. A process for preparing decorative liners comprising the steps of die pressing a sheet of material to produce a plurality of weakened lines defining a plurality of contiguous polygonal configurations; stamping said sheet of material along said lines to form said plurality of contiguous polygonal configurations into a plurality of contiguous embossed polygons having beveled edges with grooves each having sides spaced from each other at one edge thereof to form the width of the groove formed between the beveled edges of said embossed polygons, defining each of said embossed polygons, and spacing adjacent ones of said embossed polygons from each other by the width of said grooves; and pressing the sides of each of said grooves together to narrow the width of each of said grooves and to bring adjacent ones of said embossed polygons closer to each other than the first-mentioned width of said grooves.

8. A process for preparing decorative liners comprising the steps of die pressing a sheet of material to produce a plurality of weakened lines defining a plurality of contiguous polygonal configurations; stamping said sheet of material along said lines to form said plurality of contiguous polygonal configurations into a plurality of contiguous embossed polygons with grooves each having sides spaced from each other at one edge thereof to form the width of the groove formed between said embossed polygons, defining each of said embossed polygons, and spacing adjacent ones of said embossed polygons from each other by the width of said grooves; and pressing the sides of each of said grooves together to narrow the width of each of said grooves to form beveled edges on adjacent ones of said embossed polygons and to bring a portion of the sides of each of said grooves opposite one edge into substantial contact with each other.

9. A process for preparing decorative liners comprising the steps of forming in a sheet of material a first plurality of substantially parallel grooves each having sides spaced from each other at one edge thereof to form the width of the groove and joining each other at another edge thereof to form the depth of the groove; forming in said sheet of material a second plurality of substantially parallel grooves transverse to said first plurality of grooves each having sides spaced from each other at one edge thereof to form the width of the groove and joining each other at another edge thereof to form the depth of the groove; progressively narrowing the width and deepening the depth of each of the grooves of said first plurality of grooves from one end thereof to the other; and progressively narrowing the width and deepening the depth of succeeding ones of the grooves of said second plurality of grooves from the first thereof to the last thereof.

10. A process for preparing decorative liners comprising the steps of forming in a sheet of material a first plurality of substantially similarly extending grooves each having sides spaced from each other at one edge thereof to form the width of the groove and joining each other at another edge thereof to form the depth of the groove; progressively narrowing the width of each of said first plurality of grooves in a predetermined direction; progressively deepening the depth of each of said first plurality of grooves in said predetermined direction; forming in said sheet of material a second plurality of substantially similarly extending grooves extending substantially transverse to said first plurality of grooves and to said predetermined direction each having sides spaced from each other at one edge thereof to form the width of the groove; and progressively narrowing the widths of said second plurality of grooves in said predetermined direction.

11. A process for preparing decorative liners comprising the steps of forming in a sheet of material a first plurality of substantially similarly extending grooves each having sides spaced from each other at one edge thereof to form the width of the groove and joining each other at another edge thereof to form the depth of the groove; progressively narrowing the width of each of said first plurality of grooves in a predetermined direction; progressively deepening the depth of each of said first plurality of grooves in said predetermined direction; forming in said sheet of material a second plurality of substantially similarly extending grooves extending substantially transverse to said first plurality of grooves and to said predetermined direction each having sides spaced from each other at one edge thereof to form the width of the groove and defining with said first plurality of grooves a plurality of contiguous embossed polygons; and progressively narrowing the widths of said second plurality of grooves in said predetermined direction to bring adjacent ones of said embossed polygons progressively closer to each other in said predetermined direction.

12. A process for preparing decorative liners comprising the steps of forming a sheet of material to produce a plurality of weakened lines defining a plurality of contiguous polygonal configurations; stamping said sheet of material along said lines to form said plurality of contiguous polygonal configurations into a plurality of contiguous embossed polygons with grooves each having sides spaced from each other at one edge thereof to form the width of the groove formed between said embossed polygons, defining each of said embossed polygons, and spacing adjacent ones of said embossed polygons from each other by the width of said grooves; pressing the sides of each of said grooves together to narrow the width of each of said grooves and to bring adjacent ones of said embossed polygons closer to each other than the first-mentioned width of said grooves; adhering said sheet of material to a supporting sheet of removable material; and sectioning said first-mentioned sheet of material along said plurality of weakened lines.

References Cited by the Examiner

UNITED STATES PATENTS

| | | | |
|---|---|---|---|
| 1,056,871 | 3/13 | White | 29—6.1 |
| 1,704,321 | 3/29 | Hazen | 113—118 |
| 2,252,209 | 8/41 | Schank et al. | 113—118 |
| 2,391,997 | 1/46 | Noble. | |
| 2,423,863 | 7/47 | Wales. | |
| 2,583,682 | 1/52 | Celovsky | 29—163.5 XR |
| 2,633,630 | 4/53 | Woods et al. | 29—163.5 |
| 2,747,064 | 5/56 | Van Pappelendam | 113—118 |
| 2,828,792 | 4/58 | Hill | 153—2 |
| 2,861,326 | 11/58 | Bergstrom | 29—163.5 |
| 2,871,551 | 2/59 | Harris | 29—193.5 |
| 2,944,329 | 7/60 | MacKay | 29—193.5 |

CHARLES W. LANHAM, *Primary Examiner.*

HYLAND BIZOT, *Examiner.*